(12) United States Patent
Schmitt et al.

(10) Patent No.: US 7,695,546 B2
(45) Date of Patent: Apr. 13, 2010

(54) ABSORBENTS, PROCESS FOR THE PRODUCTION THEREOF AND USE THEREOF

(75) Inventors: Matthias Schmitt, Neckargemünd (DE); Martin Kuge, Maintal (DE); Reinhard Stober, Hasselroth (DE); Udo Görl, Recklinghausen (DE); Jürgen Leimann, Frankfurt (DE); Susanne Esser, Köln (DE); Peter Kopietz, Fröndenberg (DE); Silke Teike, Elsdorf (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/466,927

(22) Filed: May 15, 2009

(65) Prior Publication Data

US 2009/0250400 A1    Oct. 8, 2009

Related U.S. Application Data

(62) Division of application No. 10/225,368, filed on Aug. 22, 2002, now Pat. No. 7,560,414.

(30) Foreign Application Priority Data

Aug. 31, 2001    (DE) ................ 101 42 736

(51) Int. Cl.
   *B01D 53/14*    (2006.01)
(52) U.S. Cl. ............... 95/116; 95/141; 210/691; 210/693
(58) Field of Classification Search ................ 95/116, 95/141; 210/691, 693
   See application file for complete search history.

(56) References Cited

U.S. PATENT DOCUMENTS

| 3,787,161 A | 1/1974 | Frye et al. |
| 4,206,080 A | 6/1980 | Sato et al. |
| 4,222,727 A | 9/1980 | Adachi et al. |
| 4,789,321 A | 12/1988 | Dingus |
| 5,654,357 A | 8/1997 | Menashi et al. |
| 6,132,876 A | 10/2000 | Vogler et al. |

FOREIGN PATENT DOCUMENTS

| DE | 196 23 198 A1 | 12/1997 |
| DE | 197 58 501 A1 | 6/1999 |
| DE | 199 24 367 A1 | 11/2000 |
| EP | 0 261 687 | 3/1988 |
| EP | 1 055 440 | 11/2000 |
| WO | WO 91/05738 | 5/1991 |

OTHER PUBLICATIONS

European Search Report.
Sherstnev, P.P., "WPI World Patent Information Derwent, Derwent GB", vol. 1988, Nr. 46, WPI World Patent Information Derwent, Derwent, Great Britain, 1 page (abstract).
Kuznetsov, E.N., "WPI Worl Patent Information Derwent, Derwent, GB", vol. 1988, Nr. 40, WPI World Patent Information Derwent, Derwent, Great Britain. 1 page (abstract).

*Primary Examiner*—Stuart Hendrickson
(74) *Attorney, Agent, or Firm*—Smith, Gambrell & Russell, LLP (57) ABSTRACT

An adsorbent for organic compounds consisting of filler granules, which contain 20 to 99.9 wt. % of fillers and a binder. The adsorbent is produced by mixing at least one binder with at least one filler and performing granulation in a mixing or granulation apparatus. The adsorbent may be used for adsorbing and/or absorbing organic and/or inorganic substances from a liquid or gaseous phase.

5 Claims, 5 Drawing Sheets

ABSORBENTS, PROCESS FOR THE PRODUCTION THEREOF AND USE THEREOF

CROSS REFERENCE TO RELATED APPLICATIONS

This patent application is a divisional application based on and claiming priority on U.S. patent application Ser. No. 10/225,368 filed on Aug. 22, 2002, now U.S. Pat. No. 7,560,414 which claims priority to German Application No. 101 42 736.0 filed on Aug. 31, 2001, the contents of which are relied on and incorporated by reference herein.

INTRODUCTION AND BACKGROUND

This invention relates to adsorbents, to a process for the production thereof and to the use thereof.

Adsorptive processes are today widely used for working up process solutions, for recovering valuable materials from production solutions and for treating exhaust air and waste water. Since the requirements for the purity of production solutions, for the recovery of valuable materials and for admissible exhaust air emissions and waste water loadings are becoming ever more stringent, there is a permanent requirement for further and new development of existing adsorption technologies.

The suitability of the adsorptive process is determined by adsorber properties such as selectivity, adsorption capacity, limitation of mass transport and the service life of the adsorber.

Adsorbers based on activated carbon or polymers as well as inorganic adsorbents are today primarily used for performing adsorption from the aqueous phase or from the air. Activated carbon is a highly porous, active carbon framework which consists primarily of carbon and small quantities of chemically bound oxygen and hydrogen. Activated carbon is distinguished by very large specific surface areas in the range from 500 to 1500 $m^2/g$. The pore structure primarily consists of micro- and macropores, for which reason activated carbon is particularly effective at adsorbing molecules of a molecular weight of less than 200 Da. The specific total pore volume of activated carbon is generally 1-1.5 ml/g.

The strongly hydrophilic behaviour of the surface of activated carbon has a negative impact on its adsorption ability. Wetting of the surface with water (molecules) reduces adsorption capacity for organic, non-polar molecules. Moreover, the maximum possible size of molecule which can be adsorbed on activated carbon is limited due to the micro- and submicropores. The macro- and microporous polymer adsorbers which are now available and consist, for example, of styrene/divinyl copolymers and have specific surface areas of between 400 and 1400 $m^2/g$ are one alternative to activated carbon. Depending upon the polymer and the surface modification, these polymer adsorbers exhibit hydrophobic or hydrophilic behaviour. Optimally adsorbed molecular masses are, however, frequently below 1000 Da.

Rubber powders (for example powdered rubber) containing fillers are also known (DE 199 24 367.0). These are obtained by acid-catalysed coagulation of a polymer emulsion in the presence of a filler suspension.

Granulation processes are known, in which carbon black powders were granulated by means of a granulation auxiliary in a pelletising machine (DE 196 23 198 A1, DE 197 56 501 A1, U.S. Pat. No. 4,222,727, U.S. Pat. No. 4,789,321, U.S. Pat. No. 3,787,161).

Production of these products is associated with disadvantages. Since the powders are produced from an aqueous phase comprising filler particles and polymer droplets, the surface of the filler is partially covered with the polymer. As a consequence, this surface area is no longer available for adsorbing pollutants.

An object of the present invention is to provide a readily applicable and effective adsorbent which makes the majority of the surface available for adsorbing pollutants.

SUMMARY OF THE INVENTION

The above and other objects of the present invention can be achieved by adsorbents for organic compounds, which adsorbents are characterised in that they consist of filler granules which contain 20 to 99.9 wt. %, preferably 50 to 99.9 wt. % of fillers and optionally a binder.

The filler may be a natural or synthetic, organic or inorganic filler. The filler may be a mixture of fillers.

The binder may be mixture of binders.

The binder, for example rubber, may be homogeneously distributed on the filler.

The organic compounds may be adsorbed from aqueous systems or air.

The binder content in the granules may amount to 0.1 to 80%, preferably 0.1 to 50%.

BRIEF DESCRIPTION OF DRAWINGS

The present invention will be further understood with reference to the accompanying drawings wherein.

DETAILED DESCRIPTION OF INVENTION

Fillers which may be used are carbon blacks known from rubber processing, pigment blacks, in particular recycled materials obtained from rubber product recycling processes, such as for example powdered rubber or secondary fillers, activated carbon, white fillers of a synthetic nature, such as for example precipitated or pyrogenic silicas, zeolites, sodium aluminum silicates or natural fillers, such as for example siliceous chalk, clays, gypsum or cement.

Pulverulent recycled materials arising from thermal treatment of paint sludge (for example Salemer®) may also be used as the filler.

Carbon blacks as they are generally used in rubber processing or as pigments, as well as carbon blacks, the surface of which has been modified by oxidative or reductive post-treatment, may preferably be used.

For example, it is possible to use furnace blacks, gas blacks and lamp blacks having an iodine adsorption value of 5 to 1200 $m^2/g$, in particular of 25 to 1075 $m^2/g$, a CTAB value of 15 to 700 $m^2/g$, DBP adsorption of 30 to 400 ml/100 g and a 24 M4 DBP value of 50 to 400 ml/100 g.

In a specific embodiment, it is possible to use carbon blacks which are characterised by a particularly large specific surface area and structure, such as for example pyrolysis, arc or plasma blacks.

These carbon blacks may have an $N_2$ surface area, determined using the known BET method, of 500 to 2000 $m^2/g$, in particular of between 600 and 1500 $m^2/g$, and a DBP value of 300 to 600 ml/100 g.

Fillers having an elevated specific surface area may preferably be used. In particular, it is possible to use carbon blacks which have elevated adsorption capacities by virtue of their elevated specific surface area. Adsorption ability improves in line with the increasing surface area and structure of the carbon black. Oxidative post-treatment can modify the surface with functional groups containing oxygen and influence the adsorption behaviour of the carbon blacks.

Depending upon how the surface is modified, solvents, polymers etc. may be adsorbed to varying extents. The specific surface area of the adsorbent may be varied by the ratio of filler to binder used and by the properties of the filler.

Precipitated silicas known from the rubbers sector and pyrogenic silicas, preferably those modified to render them hydrophobic, may also be used as fillers. These may have an $N_2$ surface area, determined using the known BET method, of 35 to 1100 $m^2/g$, in particular of between 100 and 1000 $m^2/g$, a CTAB surface area of 30 to 500 $m^2/g$ and a DBP value of 150 to 400 ml/100 g.

The surface of the fillers may be modified with one or more organosilicon compounds of the general formulae $$[R^1{}_n(RO)_{3-n}Si\text{-}(Alk)_m\text{-}(Ar)p]q[B] \quad (I),$$

$$R^1{}_n(RO)_{3-n}Si\text{-}(Alkyl) \quad (II),$$

or $$R^1{}_n(RO)_{3-n}Si\text{-}(Alkenyl) \quad (III)$$

in which
B: means —SCN, —SH—, —Cl, —$NH_2$ (if q=1) or -Sx- (if q=2)
R and $R^1$: mean an alkyl group, branched or unbranched, having 1 to 4 carbon atoms, a phenyl residue, wherein all residues R and $R^1$ may in each case have the same or a different meaning, preferably an alkyl group,
n: means 0; 1 or 2
Alk: means a divalent linear or branched carbon residue having 1 to 6 carbon atoms,
m: means 0 or 1
Ar: means an arylene residue having 6 to 12 C atoms
p: means 0 or 1, providing that p and n do not simultaneously mean 0,
x: means a number from 2 to 8,
Alkyl: means a monovalent linear or branched, unsaturated hydrocarbon residue having 1 to 20 carbon atoms, preferably 2 to 8 carbon atoms,
Alkenyl: means a monovalent linear or branched, unsaturated hydrocarbon residue having 2 to 20 carbon atoms, preferably 2 to 8 carbon atoms.

The adsorbents according to the invention may also contain the stated fillers, such as for example silicas, powdered rubber, activated carbon, sodium aluminum silicates, zeolites, cement, gypsum and carbon black, not only individually but also as a mixture.

Depending upon the filler content of the adsorbent, filler particles may be incorporated info the surface such that the particles produced using the process according to the invention do not stick together, even under pressure, if for example several sacks are stacked on upon the other.

Any known rubbers may be used individually or as a mixture thereof as the binder. They may be used as latices, aqueous polymer emulsions, rubber solutions. The following may preferably be used, natural rubber, emulsion SBR having a styrene content of 10 to 50%, butyl/acrylonitrile rubber, butyl rubber, nitrile rubber, terpolymers of ethylene, propylene (EPM) and unconjugated dienes (EPDM), butadiene rubber, DBR, produced by the solution polymerisation process, having a styrene content of 10 to 25%, and 1,2-vinyl unit contents of 20 to 55% and isoprene rubbers, in particular 3,4-polyisoprene, fluororubber, chlorinated rubber, silicone rubber.

Apart from the stated rubbers, the following elastomers may also be used, individually or as a mixture: carboxyl rubbers, epoxy rubbers, trans-polypentenamer, halogenated butyl rubbers, rubbers prepared from 2-chlorobutadiene, ethylene/vinyl acetate copolymers, block polymers, epichlorohydrins, chemically modified natural rubbers, such as for example epoxidised grades.

Oils, waxes or other long-chain hydrocarbons may also be used as binders as pure substances, melts, solutions or emulsions individually or as a mixture.

The adsorbents according to the invention may accordingly contain any known plastics dispersions based on styrene acrylate (for example Mowilith™), vinyl acetate or pure acrylate, or also resins such as alkyd resins, epoxy resins or olefinic waxes (Ultralube®) individually or as a mixture thereof. Latices, aqueous polymer emulsions, rubber solutions or melted waxes may also be used as binders.

Some of the raw materials used in the adsorbents according to the invention may be disposed of thermally to leave virtually no residues, which should be considered another advantage in comparison with numerous, in particular also inorganic, adsorbents.

The present invention also provides a process for the production of the adsorbents according to the invention, which process is characterised in that at least one binder is mixed with at least one filler and granulated in a mixing or granulation apparatus.

In one specific embodiment, a mixing granulator may be used as the mixing or granulation apparatus. The solid may here be apportioned into the mixing granulator by means of gravimetric or volumetric powder metering. By using a spiked shaft as the mixing and granulation device, the material being mixed may be conveyed to the outlet. Metering of the granulation auxiliary (as an aqueous emulsion, latex, melt or solution) may proceed volumetrically or gravimetrically. The granulation auxiliary (mixture) may be injected by means of one or more nozzles at one or more locations. Different granulation auxiliaries (mixtures) may also be injected at different points. The mixing temperature may be from 20° to 140° C., preferably from 60° to 120° C. The rotational speed of the test unit may vary within the range from 100 to 1500 rpm, preferably from 100 to 1000 rpm. The filler throughput of the test unit may vary from 10 to 150 kg/h, preferably from 20 to 80 kg/h. The test unit may draw an electric current of 10 to 30 A. Filler throughput for a production plant may vary from 0.5 to 3.5 t/h and, in a preferred embodiment, between 0.5 and 1.5 t/h. The circumferential speed of the spike tips may be between 1 and 30 m/s, preferably between 10 and 20 m/s. The residence time of the filler in the mixing granulator may be between 20 and 600 seconds.

In addition to the manner of injecting the granulation auxiliary, the place of injection may also have a significant influence on the quality of the resultant preparation.

The mixing granulator consists of a horizontally arranged, stationary tube (stator) having a spiked shaft rotating therein. The mixing granulator usually has an inlet zone, in which the starting solid (or a mixture of various substances) is introduced into the mixing granulator. This zone accommodates a conveying screw which imparts an axial motion component to the introduced filler. Downstream from the inlet zone is the actual granulation zone, in which the solid agglomerates due to the mechanical action of the rotating spikes and by rolling along the internal wall of the stator. After leaving the granulation zone, the already pellet-shaped adsorbent passes into the outlet zone and is continuously discharged from the mixing granulator.

In a preferred variant of the process, the granulator, which may also be described as a high-speed mixer, may be oriented not horizontally, but instead be obliquely inclined. This inclination may be as much as 90°, which means that the axis of the mixer is oriented vertically. This arrangement has the advantage that the residence time of the product in the unit may be varied within wide ranges. The filler may be apportioned and mixed with the binder. In the process variant described here, it is also possible to make use of the above-described possibilities for influencing grain morphology, coating or mixing of different binders or fillers. Instead of the pulverulent filler, it is also possible to introduce moist material or a suspension (in water or solvents). Due to the elevated shearing action of the rotor or due to the rolling motion imparted to the granules in the apparatus, it is possible to obtain approximately spherical particles. Even when suspensions (solutions) of the filler are used, it may be possible to make use of the above-described possibilities for influencing grain morphology, coating or mixing of different granulation auxiliaries or fillers. Combined addition of the fillers may also be carried out, which means, for example, that the filler powder is first mixed with a binder and then a filler suspension is additionally added, or vice versa.

Physical/chemical processes may also be carried out in the mixer, such as for example a reaction between silica and organosilanes or evaporation of water or solvents. In the event that a product is to be produced with binders which have a tendency to sticking, it is possible to add further solid (the same or a different solid) at one or more points in the granulator. This additional coating may significantly improve the flow behaviour of the granules.

Depending upon the design of the mixing granulator, the individual zones of the mixing granulator may be of different sizes. In any event, the inlet and outlet zones should be kept as small as possible to the benefit of the granulation zone. Once the pulverulent starting solid has entered the granulation zone, agglomeration of the solid begins and is complete at the end of this zone. In order to ensure a maximally homogeneous distribution of the binder over the entire cross-section of the filler pellets, it is necessary to inject the binder over the filler in the first third of the granulation zone.

The homogeneity of incorporation of the binder into the filler may be further improved by using two or more spray nozzles for injection which are distributed on the circumference of the stator in a plane perpendicular to the spiked shaft. The number of nozzles may conveniently be restricted to two to five.

Due to the small clearance between the tips of the spikes and the internal wall of the stator, it is possible very largely to avoid the formation of deposits. As a result, a more homogeneous distribution of the granulation auxiliary on the filler may be achieved.

Figure 1:
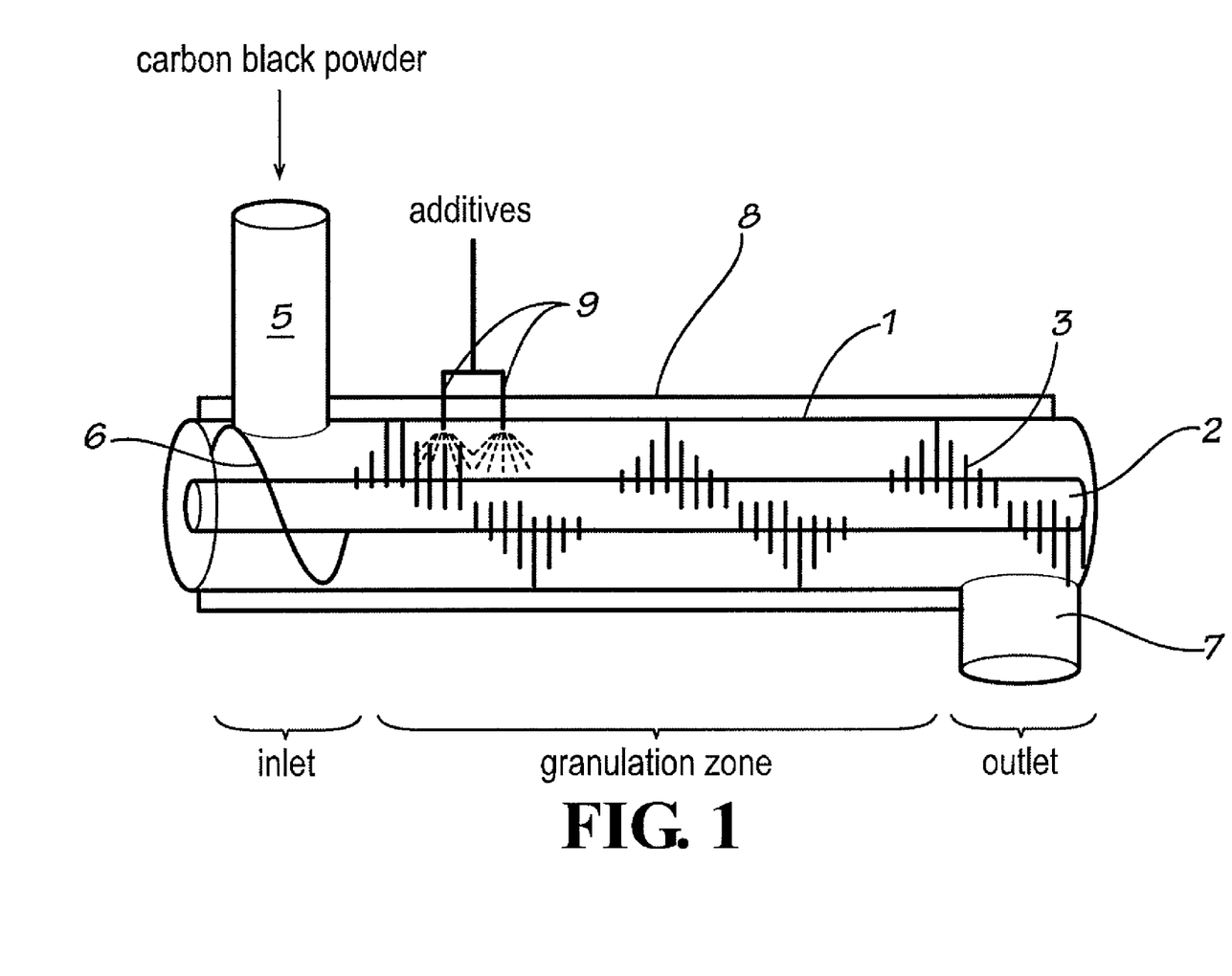
FIG. 1 is a schematic view of an apparatus for the present invention.

This specific embodiment of the process according to the invention for the production of the adsorbent is illustrated in greater detail in FIG. 1 (schematic diagram of the mixing granulator).

According to FIG. 1, the mixing granulator consists of a horizontally arranged, stationary tube, the stator 1, and a rotating spiked shaft 2 arranged axially therein having helically arranged spikes 3. The pelletizing chamber of the mixing granulator is located between the spiked shaft 2 and the stator 1. The filler is introduced into the granulator at the inlet 5. In the inlet zone, a conveying screw 6 is located on the spiked shaft 2, which conveying screw conveys the filler in an axial direction towards the outlet 7. The stator 1 is of double-walled construction and permits temperature control of the stator walls with the assistance of a fluid 8. In the first third of the granulation zone of the stator, there are located through-holes in the upper side of the stator, through which are introduced spray nozzles 9 for addition of the granulation auxiliary.

The products produced in this manner may, if necessary, subsequently be dried and used as an adsorbent in environmental engineering.

The above-stated solids may preferably be used in finely divided form.

Fillers which are produced from a liquid phase may also be used as a filter cake. For example, precipitated silica may also be used in the form of a filter cake which has been washed free of salt.

If the raw materials used in the adsorbent consist solely of carbon black or a carbon black/latex mixture, they may be disposed of thermally to leave virtually no residues. This should be considered another advantage in comparison with inorganic adsorbents known from the prior art.

Although, depending upon the fillers they contain, the specific surface areas of the adsorbents according to the invention are lower than those of conventionally used activated carbons, they have a higher equilibrium capacity when, for example, adsorbing compounds from the aqueous phase.

The novel adsorbents have proved particularly suitable for adsorbing non-polar, sparingly water-soluble organic compounds from aqueous systems and from air.

Use of the adsorbents according to the invention is in particular advisable when the adsorptives are present in moderate to high concentrations, the adsorptives have poor water solubility or a high octanol/water distribution coefficient and when elevated purity requirements are placed upon the filtrate.

Adsorbents according to the invention having a filer content of >90 to 99.9%, in particular fillers having elevated structure and elevated surface area, may particularly suitably be used for this application.

Water pollution caused by oil spills from ships is a significant problem.

The oil-binding capacity of the novel adsorbent may in particular be varied by means of the ratio of carbon black to granulation auxiliary used and by the properties of the carbon black (primary particle diameter, structure). By appropriate selection of both components, the oil binder may be optimally tailored to specific requirements (for example for adsorbing light or heavy oil). Due to the surface-active properties of carbon black, it is also possible to adsorb low molecular weight substances, so further increasing the clean-up performance of the adsorbent according to the invention with regard to a possible residual COD.

Adsorbents according to the invention having a filler content of 50 to 99.9%, in particular of 65 to 97%, have proved particularly suitable for absorbing oils floating on water (oil in phase). This adsorbent may be put to practical use for absorbing oil in the following manners:

In the case of tanker spills, extensive spreading of the adsorber from helicopters or, mixed with water, by water cannons.

The absorber picks up oil from the water's surface within a short time, binding it irreversibly. The granules turn into bulky, rubbery aggregates which are easily collected. The product according to the invention can also absorb oil from emulsions.

Separation of hydrocarbons and emulsions by fixed-bed columns. At a pressure drop of between 1 and 2 bar/m, linear flow rates of 20 to 40 m/h can be achieved for water using the novel products.

Absorption of oil from water by articles such as cushions, tubes and absorbent booms filled with oil binder.

Apart from extensive spreading and using separation containers, it is also possible to incorporate the adsorbent into textiles and use it in the form of self-absorbing oil barriers, tubes and cushions for cleaning up contaminated water.

The advantages of the adsorbent used according to the invention over commercially available oil-binding agents, such as for example polypropylene and cellulose, reside in its highly oleophilic nature and elevated oil absorption capacities (up to approx. 7 liters/kg of adsorber), properties which are due to the large proportion of macropores in the molecule. This pore structure permits efficient mass transport in the adsorbing agent, irreversible binding of the oil and an extended service life.

Thanks to the hydrophobicity of the polymer optionally used as granulation auxiliary, wetting of the oil binder with water and thus potential coadsorption are furthermore very greatly reduced.

The adsorbent according to the invention absorbs gasoline in the same way as waxes. It is accordingly possible to bind aliphatic hydrocarbons, in particular those having 5 to 35 carbon atoms, i.e. molecules of approx. 70 to 500 Da.

Such compounds also include low molecular weight compounds having 5 to 8 carbon atoms (benzene, toluene etc.).

Treating washing water from motor vehicle washing plants is another significant problem. In this case, it is necessary irreversibly to absorb small quantities of non-polar substances, such as oil, gasoline, waxes, which are partially dispersed and to ensure a long adsorber service life.

Here too, it is possible to control the oil-binding capacity of the novel adsorbent by means of the ratio of carbon black to granulation auxiliary used (advantageously a polymer in this case) and by the properties of the carbon black (primary particle diameter, structure). By appropriate selection of both components, the adsorbent may be optimally tailored to an extended service life and specific requirements (for example adsorbing light oil or gasoline). Due to the surface-active properties of carbon black, it is also possible to adsorb low molecular weight substances, so further increasing the clean-up performance of the absorbent with regard to a possible residual COD.

Adsorbents according to the invention having a filler content of 50 to 99.9 wt. %, in particular of 65 to 97 wt. %, have proved particularly suitable for absorbing oils dispersed in water.

This adsorber is put to practical use in water treatment plants.

The absorber breaks the dispersion, absorbs the non-polar compounds from the water and binds them irreversibly.

Separation of hydrocarbons and emulsions by fixed-bed columns. At a pressure drop of between 1 and 2 bar/m, linear flow rates of 20 to 40 m/h can be achieved for water using the novel products.

The advantages of the adsorbent used according to the invention over commercially available oil binding agents, such as for example polypropylene and cellulose, reside in its highly oleophilic nature and elevated oil absorption capacities (up to approx. 7 liters/kg of adsorber), properties which are due to the large proportion of macropores in the molecule. This pore structure permits efficient mass transport in the adsorbing agent, irreversible binding of the oil and an extended service life.

Thanks to the hydrophobicity of the polymer for example used as granulation auxiliary, wetting of the oil binder with water and thus potential coadsorption are furthermore very greatly reduced. The adsorbent according to the invention absorbs petrol in the same way as waxes. It is accordingly possible to bind aliphatic hydrocarbons, in particular those having 5 to 35 carbon atoms, i.e. molecules of approx. 70 to 500 Da.

Such compounds also include low molecular weight compounds having 5 to 8 carbon atoms (benzene, toluene etc.).

Emissions of fuels from fuel containers, for example while refueling motor vehicles, are another significant problem. In this case, activated carbon is used as adsorber in conjunction with extraction devices or as an additional fitting to tanks. Activated carbon is distinguished by good adsorption characteristics, gasoline vapour being irreversibly absorbed. Once the adsorption capacity has been reached, the activated carbon must be regenerated.

The adsorbent described here according to the invention is distinguished in a specific embodiment in that aliphatic or aromatic hydrocarbons, gasolines, toluene or also halogenated hydrocarbons are very well adsorbed at elevated concentrations in air (ratio of partial pressure to saturation partial pressure >0.2). However, unlike with activated carbon, adsorption is reversible instead of being irreversible. In other words, the concentration of the hydrocarbons drops sharply (ratio of partial pressure to saturation partial pressure <0.1). The adsorbed substances are then slowly released back into the environment. In other words, this specific embodiment of the adsorber regenerates itself automatically.

The adsorption capacity of the adsorbent according to the invention is determined by the ratio of carbon black to granulation auxiliary used and by the properties of the carbon black (primary particle diameter, structure). Adsorbents according to the invention having a filler content of 50 to 99.9%, in particular of 70 to 99%, are particularly suitable for absorbing hydrocarbons from air. Carbon blacks which are preferably used as filler are those which are distinguished by a particularly large specific surface area and structure (pyrolysis, arc or plasma blacks) with an iodine adsorption value of 400 to 1200 $m^2/g$, in particular of 600 to 1200 $m^2/g$ The adsorber according to the invention is put to practical use, for example, in vehicles as filter systems in the fuel circuit. Gaseous emissions on refueling can be prevented by a suitable filter system in the vehicle's filler pipe. Once refueling is complete and the tank closed, the adsorber regenerates itself automatically. This operation may be controlled by introducing fresh air. The exhaust air containing fuel may then be passed to the engine for combustion.

Examples 1-4

The following Examples illustrate production and adsorption behaviour for methylene blue by way of example in comparison with adsorbents known from the prior art.

Raw Materials Used:

Carbon Black Filler

TABLE 1

Characteristics of the carbon black fillers used

|  | Carbon black 1 | Carbon black 2 | Carbon black 3 |
|---|---|---|---|
| $N_2$ surface area (BET) [$m^2$/g] | approx. 800 | approx. 800 | approx. 800 |
| DBP absorption [ml/100 g] | approx. 350 | approx. 350 | approx. 350 |
| Moisture content [%] | approx. 82 | approx. 85 | approx. 10 |

Additives

Additive 1: Ultralube, paraffinic wax

Additive 2: Mowilith, styrene/acrylic acid ester based dispersion

Additive 3: E-SBR, Kagetex LBS 3060 (emulsion of a styrene/butadiene copolymer: styrene content approx. 30%)

Description of Performance of Testing (Examples 1-4)

The fillers (Table 1) are granulated in accordance with the embodiment according to the invention in a mixing granulator (FIG. 1) at constant throughput. The additives are metered volumetrically by means of suitable atomization devices in the processing chamber of the granulator.

After granulation, the products are dried to constant weight in a drying cabinet. Table 2 shows the test settings for the production of the individual products of the Examples.

TABLE 2

Test parameters for the production of the products of the Examples

|  | Example 1 | Example 2 | Example 3 | Example 4 |
|---|---|---|---|---|
| Filler | 1 | 1 | 2 | 3 |
| Rate of addition [kg/h] | 40 | 40 | 40 | 20 |
| Additive | 1 | 2 | 3 | 3 |
| Content [%] | 7 | 7 | 7 | 7 |
| Location of addition | approx. 5 cm after introduction of filler into granulator ||||
| Mixer temperature [° C.] | 100 | 100 | 100 | 100 |

Table 3 compares the analytical results for the samples produced with those for the two reference products.

The reference products are:

Reference 1: Rubber powder according to DE 199 24 367.0 having a rubber content of 17% and an $N_2$ surface area (BET) of 455 m/g.

Reference 2: Shaped activated carbon (Carbotech D43/1)

TABLE 3

Analytical results for products of the Examples and reference products

|  | Ex. 1 | Ex. 2 | Ex. 3 | Ex. 4 | Ref. 1 | Ref. 2 |
|---|---|---|---|---|---|---|
| Filler | 1 | 1 | 2 | 3 | — | — |
| Additive | 1 | 2 | 4 | 4 | — | — |
| Content [%] | 7 | 7 | 7 | 7 | — | — |
| Fines content (2 min) [%] | 1.3 | 2.3 | 13.9 | 15.1 | — | — |
| Pellet abrasion (8 min) [%] | 0.5 | 0.4 | 1.1 | 1.1 | — | — |
| $d_{20}$ [µm] | 580 | 310 | 110 | 720 | — | — |
| $D_{50}$ [µm] | 1160 | 620 | 480 | 1170 | — | — |
| $D_{80}$ [µm] | 1690 | 850 | 970 | 1680 | — | — |
| Max. equilibrium capacity for methylene blue [mg/g] | approx. 130 | approx. 180 | approx. 180 | approx. 180 | approx. 75 | approx. 70 |

Figure 2:
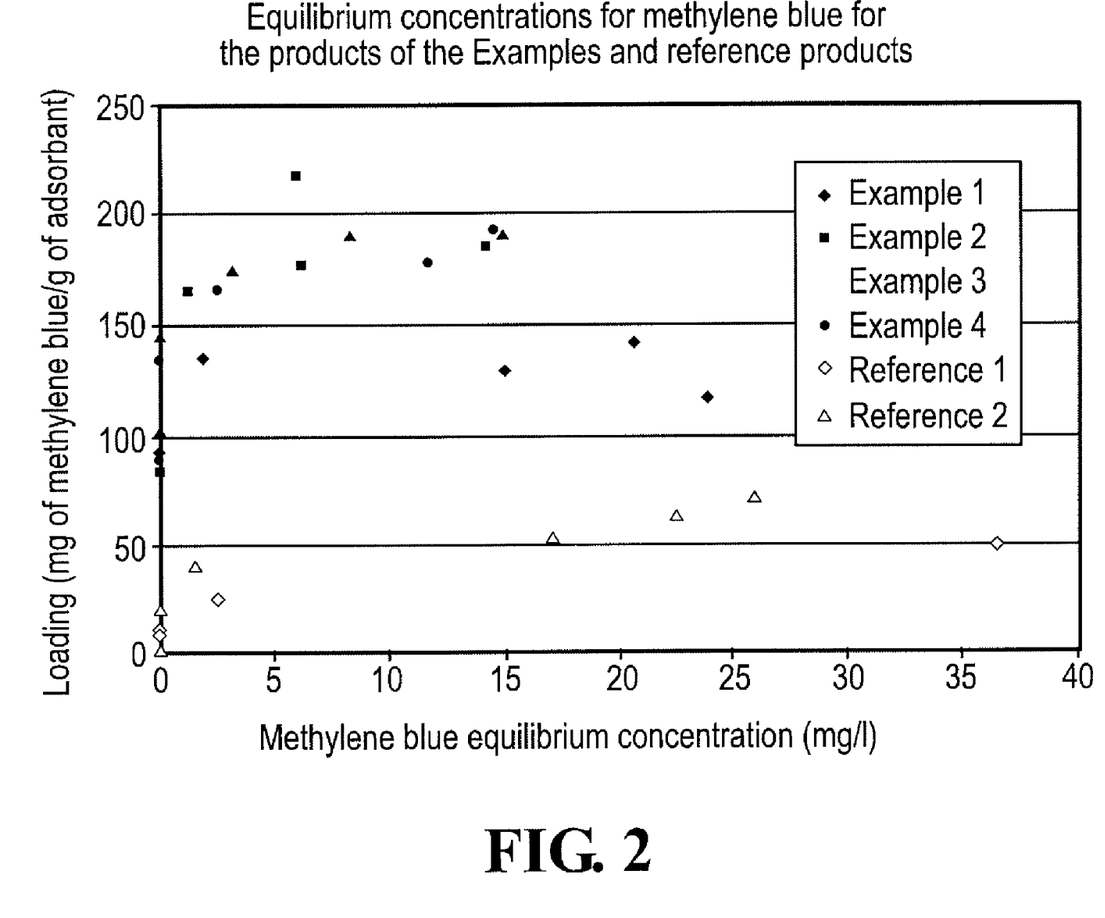
FIG. 2 is a chart showing equilibrium concentrations for methylene blue for the products of the example and reference products.

FIG. 2 shows the equilibrium capacity for methylene blue in the different adsorbents.

As is shown by the adsorption capacity values determined, the products according to the invention exhibit a considerably higher absorption capacity than do the comparable reference products.

Example 2

Gas Phase Adsorption

Adsorption equilibria were measured for various adsorbers in a thermobalance. Before the beginning of the test, the samples were dried for approx. 2 h at 70° C. under a nitrogen atmosphere in order to eliminate any possible influence due to residual moisture. The adsorption measurements were then carried out at 25° C. with the adsorptives toluene, isopropanol and 1,2-dichloroethane at various partial pressures. Nitrogen is used as the carrier gas. The initial weight of the adsorbing agent is approx. 200 mg, while gas was passed over the adsorbing agent at approx. 500 Nml/min. The gaseous mixture is passed over the initially unloaded sample. The increase in sample weight over time is then measured. As soon as the rate of change of the measured increase in weight over time approaches zero, it may be assumed that an adsorption equilibrium has been established in the thermobalance. One point on the adsorption isotherms may then be determined from the ratio of increase in weight to initial sample weight. Desorption tests are performed with pure nitrogen at 25° C. and 70° C.

The adsorbers tested substantially differ with regard to the quantity ratio of carbon black:polymer and with regard to the nature of the carbon black used.

Figure 3:
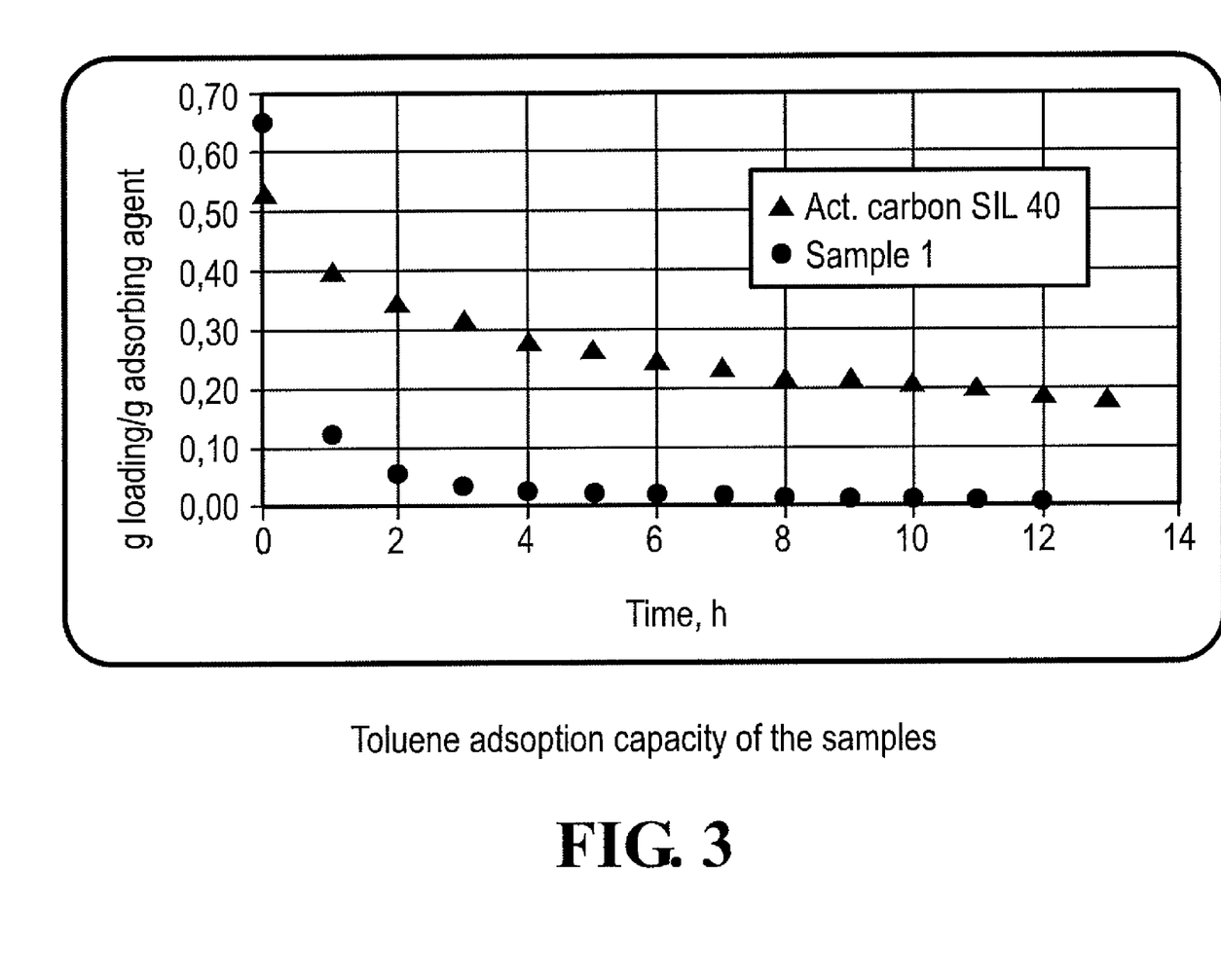
FIG. 3 is a chart showing toluene absorption capacity of the samples.

FIG. 3 shows the measured adsorption capacity values for some samples tested at 25° C. The values shown are toluene loadings, which are calculated here from the weight ratio of adsorbed quantity of substance to initial sample weight (dry). Comparison of the individual products among themselves shows that samples 1 and 2 in particular permit very high adsorption capacities.

A vital factor in the assessment of the novel adsorbers is the comparison with competing environmental engineering products. Activated carbon may in particular be mentioned as a competing product. Important comparison criteria are the shape of the adsorption isotherms in the relevant concentration range and regeneration or desorption behaviour. Both criteria are tested.

Industrial environmental engineering adsorbents are primarily characterised in that the rise in the adsorption isotherms is steep in the low concentration range and that there is a saturation loading at higher concentrations. This latter property means that unwanted desorption phenomena can be avoided in the event of varying exhaust air concentrations.

Figure 4:
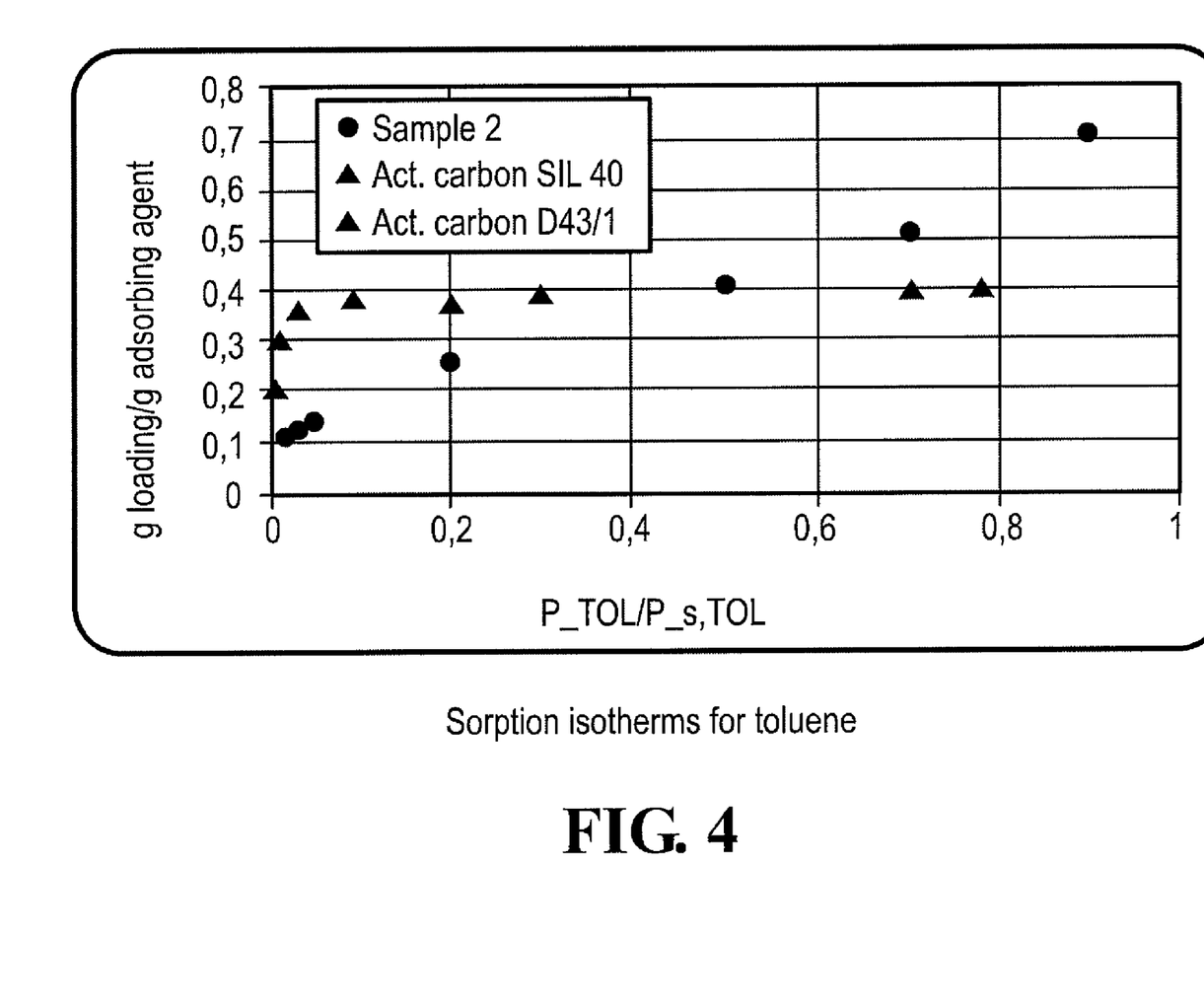
FIG. 4 is a chart of sorption isotherms for toluene.

FIG. 4 shows in this connection the toluene isotherms for sample 2 and for two industrial activated carbons. The comparison makes it clear that the gradient of the isotherms for sample 2 in the low concentration range is flatter than it is for the activated carbons. At moderate concentrations, the activated carbons have already reached their saturation capacity, while the novel adsorbent can be seen to exhibit a largely linear rise in its isotherm.

Within this concentration range, adsorption capacities are comparable. At very high toluene concentrations, distinctly higher loadings can be achieved with the novel adsorbent than with the activated carbons.

Figure 5:
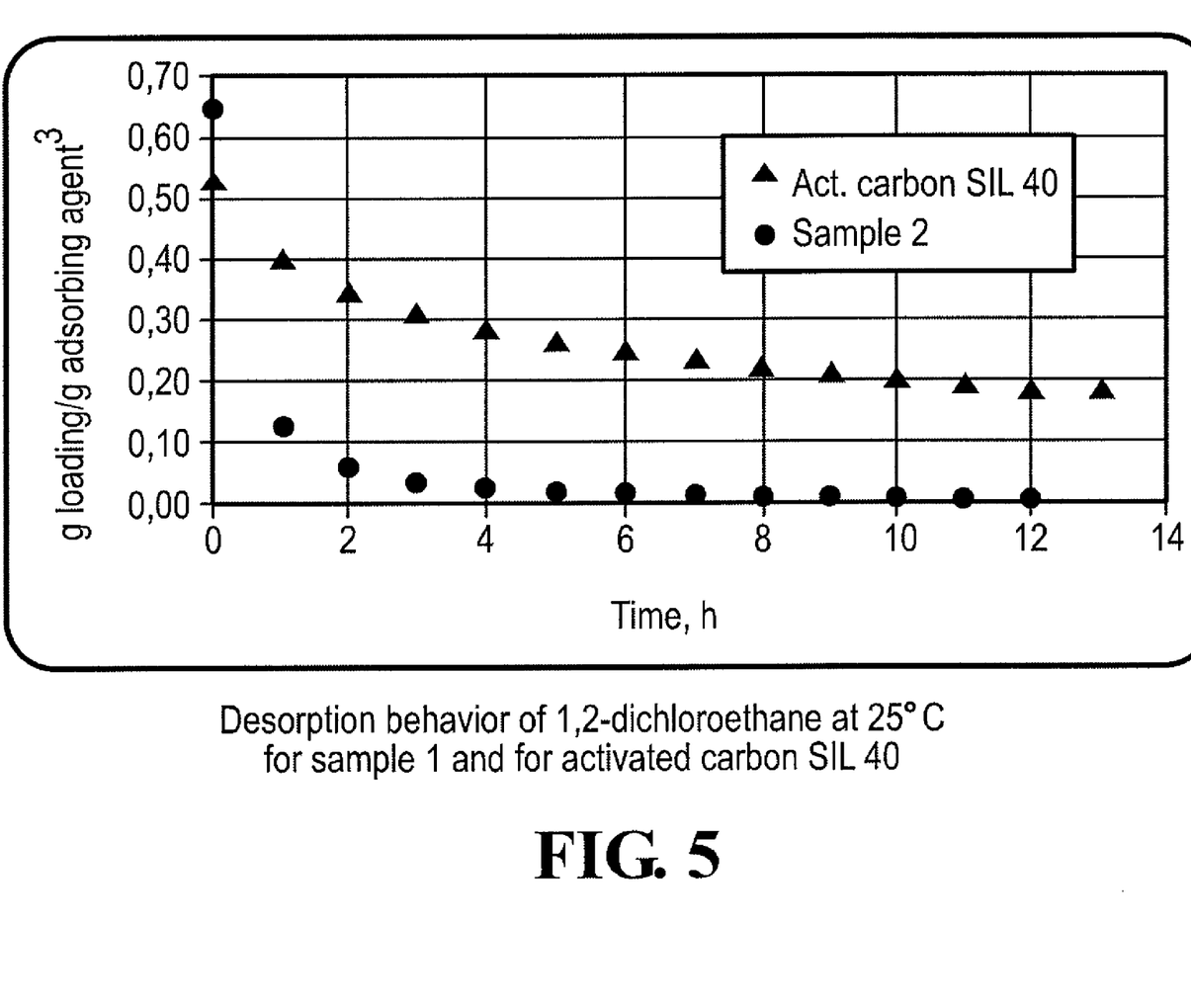
FIG. 5 is a chart showing desorption behavior of 1,2-dichloroethane at 25° C. for sample 1 and for activated carbon SIL A40.

The second evaluation criterion for the novel adsorbers is their regeneration behaviour. FIG. 5 shows DCE desorption kinetics for sample 1 and for activated carbon SIL 40. Once an adsorption equilibrium has been established at a DCE concentration of PDCE/Ps,DCE=0.7, the laden gas is replaced with an inert gas. The drop in weight over time is then measured. It can be seen that desorption of the novel adsorbent is distinctly faster than that of activated carbon. With regard to the regeneration of loaded adsorbents, the novel adsorber accordingly exhibits distinct advantages over activated carbon.

Further variations and modifications of the foregoing will be apparent to those skilled in the art and are intended to be encompassed by the claims appended hereto.

German priority application 101 42 736.0 is relied on and incorporated herein by reference.

We claim:

1. A process for adsorbing and/or absorbing organic and/or inorganic substances from a liquid or gaseous phase comprising contacting said liquid or gaseous phase with an adsorbent which is a spherical granular adsorbent for organic compounds consisting of granules which contain 20 to 99.9 wt. % of filler particles of silica and rubber as a binder, said adsorbent having been made by a process of mixing at least one binder which is rubber with at least one filler particle which is silica in a granulator having a spiked shaft, by injecting the binder by means of at least one nozzle into said granulator in at least one location and granulating resulting mixture, whereby the filler particles are incorporated into the surface of the binder such that the resulting adsorbent does not stick together, said mixing taking place at a temperature of from 20° to 140° C., with a rotational speed of the granulator being from 100 to 1500 rpm, and where the circumferential speed of spike tips in said spiked shaft is 1 to 30 meters/sec.

2. The process according to claim 1 wherein said substance is an oil spill in water.

3. A method for treating an oil spill in water comprising spreading an adsorbent on the water surface whereby said adsorber picks up the oil and binds it irreversibly to form aggregates and thereafter collecting said aggregates, wherein said adsorbent is a spherical granular adsorbent for organic compounds consisting of granules which contain 20 to 99.9 wt. % of filler particles of silica and rubber as a binder, said adsorbent having been made by a process of mixing at least one binder which is rubber with at least one filler particle which is silica in a granulator having a spiked shaft, by injecting the binder by means of at least one nozzle into said granulator in at least one location and granulating resulting mixture, whereby the filler particles are incorporated into the surface of the binder such that the resulting adsorbent does not stick together, said mixing taking place at a temperature of from 20° to 140° C., with a rotational speed of the granulator being from 100 to 1500 rpm, and where the circumferential speed of spike tips in said spiked shaft is 1 to 30 meters/sec.

4. A method for controlling pollution comprising treating washing water from motor vehicle washing plants with an adsorbent which is a spherical granular adsorbent for organic compounds consisting of granules which contain 20 to 99.9 wt. % of filler particles of silica and rubber as a binder, said adsorbent having been made by a process of mixing at least one binder which is rubber with at least one filler particle which is silica in a granulator having a spiked shaft, by injecting the binder by means of at least one nozzle into said granulator in at least one location and granulating resulting mixture, whereby the filler particles are incorporated into the surface of the binder such that the resulting adsorbent does not stick together, said mixing taking place at a temperature of from 20° to 140° C., with a rotational speed of the granulator being from 100 to 1500 rpm, and where the circumferential speed of spike tips in said spiked shaft is 1 to 30 meters/sec.

5. The process according to claim 1, wherein the filler particles of silica have their surfaces modified with one or more organosilicon compounds of the formulae $$[R^1{}_n(RO)_{3-n}Si\text{-}(Alk)_m\text{-}(Ar)p]q[B] \quad (I),$$

$$R^1{}_n(RO)_{3-n}Si\text{-}(Alkyl) \quad (II),$$

or $$R^1{}_n(RO)_{3-n}Si\text{-}(Alkenyl) \quad (III)$$

in which

B: means —SCN, —SH, —Cl, —NH$_2$ (if q=1) or -Sx- (if q=2), and

B is attached to Ar when p=1, or B is attached to Alk when p=0,

R and R$^1$: mean an alkyl group, branched or unbranched, having 1 to 4 carbon atoms, a phenyl residue, wherein all residues R and R$^1$ may in each case have the same or a different meaning, n: means 0; 1 or 2

Alk: means a divalent linear or branched carbon residue having 1 to 6 carbon atoms, m: means 0 or 1

Ar: means an arylene residue having 6 to 12 C atoms p: means 0 or 1, providing that p and m do not simultaneously mean 0, q: is 1 or 2 x: means a number from 2 to 8,

Alkyl: means a monovalent linear or branched, unsaturated hydrocarbon residue having 1 to 20 carbon atoms, Alkenyl: means a monovalent linear or branched, unsaturated hydrocarbon residue having 2 to 20 carbon atoms.

* * * * *

UNITED STATES PATENT AND TRADEMARK OFFICE
CERTIFICATE OF CORRECTION

| | | |
|---|---|---|
| PATENT NO. | : 7,695,546 B2 | Page 1 of 1 |
| APPLICATION NO. | : 12/466927 | |
| DATED | : April 13, 2010 | |
| INVENTOR(S) | : Schmitt et al. | |

It is certified that error appears in the above-identified patent and that said Letters Patent is hereby corrected as shown below:

Title Page, Item (75) Inventor is corrected to read:

-- Matthias Schmitt of Neckargemund (DE)
Martin Kuge of Maintal (DE)
Reinhard Stober of Hasselroth (DE)
Udo Görl of Recklinghausen (DE)
Jurgen Leimann of Frankfurt (DE)
Susanne Esser of Köln (DE)
Jan Kopietz of Fröndenberg
Silke Teike of Elsdorf (DE) --.

Signed and Sealed this
Seventeenth Day of February, 2015

Michelle K. Lee
*Deputy Director of the United States Patent and Trademark Office*